(12) United States Patent
Lebert

(10) Patent No.: US 9,420,870 B2
(45) Date of Patent: Aug. 23, 2016

(54) METHOD FOR ATTACHING LIPSTICK TO A LIPSTICK DISPENSER, AND CORRESPONDING MACHINE

(75) Inventor: Jean-Jocelyn Lebert, Checy (FR)

(73) Assignee: Parfums Christian Dior, Paris (FR)

( * ) Notice: Subject to any disclaimer, the term of this patent is extended or adjusted under 35 U.S.C. 154(b) by 98 days.

(21) Appl. No.: 14/114,369

(22) PCT Filed: Jun. 20, 2012

(86) PCT No.: PCT/FR2012/051400
§ 371 (c)(1),
(2), (4) Date: Jan. 23, 2014

(87) PCT Pub. No.: WO2012/175875
PCT Pub. Date: Dec. 27, 2012

(65) Prior Publication Data
US 2014/0130457 A1    May 15, 2014

(30) Foreign Application Priority Data

Jun. 22, 2011 (FR) ........................... 11 55510

(51) Int. Cl.
*A45D 40/16* (2006.01)
*B23P 19/12* (2006.01)
(Continued)

(52) U.S. Cl.
CPC .............. *A45D 40/16* (2013.01); *B23P 19/006* (2013.01); *B23P 19/12* (2013.01); *B65B 3/14* (2013.01);
(Continued)

(58) Field of Classification Search
CPC ....... A45D 40/02; A45D 40/04; A45D 40/06; A45D 40/16; B23P 11/00; B23P 19/00; B23P 19/006; B23P 19/02; B23P 19/027; B23P 19/04; B23P 19/10; B23P 19/12; B65B 3/04; B65B 3/14; B29C 66/8266; B29C 66/82661; B29C 37/0003; B29C 37/0007; B29C 39/36; B29C 65/565; B29C 65/64; B29C 65/7802; B29C 66/006; B29C 33/046; B29C 33/46; B29C 33/50; B29C 33/04; B29L 2031/718; B29L 2031/7184; Y10S 425/032; Y10T 29/53443
See application file for complete search history.

(56) References Cited

U.S. PATENT DOCUMENTS 2,192,675 A * 3/1940 Ferentzy .................. A61J 3/08
                                                    249/160
2,263,302 A * 11/1941 Johnson ................. B29C 67/00
                                                    425/117
(Continued)

FOREIGN PATENT DOCUMENTS

DE          900 544 C     12/1953
EP          1 437 062 A1   7/2004
(Continued)

OTHER PUBLICATIONS

International Search Report for PCT/FR 2012/051400, report dated Oct. 10, 2012.

*Primary Examiner* — Christopher Besler
*Assistant Examiner* — Matthew P Travers
(74) *Attorney, Agent, or Firm* — Miller, Matthias & Hull LLP

(57) ABSTRACT

The invention relates to a method for attaching lipstick to a lipstick dispenser and to a corresponding machine. The method for attaching lipstick to a dispenser, wherein the dispenser includes a distal end for the lips, and the dispenser includes a receptacle having an insertion opening fitted to a proximal end of the stick. The method includes: a moving step in which the insertion opening and the proximal end of the stick are moved adjacent to one another so as to substantially block the insertion opening; and a nesting step in which the stick is nested in the receptacle via a recess formed in the receptacle.

11 Claims, 4 Drawing Sheets

(51) Int. Cl.
*B65B 3/14* (2006.01)
*B65B 31/02* (2006.01)
*B23P 19/00* (2006.01)
*A45D 40/04* (2006.01)
*B29C 33/04* (2006.01)
*B29C 33/50* (2006.01)
*B29C 37/00* (2006.01)
*B29L 31/00* (2006.01)

(52) U.S. Cl.
CPC ............... *B65B 31/025* (2013.01); *A45D 40/04* (2013.01); *B29C 33/046* (2013.01); *B29C 33/50* (2013.01); *B29C 37/0007* (2013.01); *B29L 2031/7184* (2013.01); *Y10S 425/032* (2013.01); *Y10T 29/53443* (2015.01)

(56) References Cited

U.S. PATENT DOCUMENTS

| | | | | | |
|---|---|---|---|---|---|
| 2,329,375 | A | * | 9/1943 | Houlihan | A45D 40/00 206/457 |
| 2,564,624 | A | * | 8/1951 | Hoos | A61J 3/08 264/335 |
| 3,315,344 | A | * | 4/1967 | Niclas | A45D 40/06 206/385 |
| 3,677,677 | A | * | 7/1972 | Coppola | B30B 11/08 425/225 |
| 3,740,810 | A | * | 6/1973 | Austin | A45D 40/16 249/205 |
| 3,978,568 | A | * | 9/1976 | Frydlender | A45D 40/16 29/33 K |
| 4,051,878 | A | * | 10/1977 | Ohmeis | A45D 40/16 141/150 |
| 4,543,702 | A | * | 10/1985 | Wada | A45D 40/16 264/242 |
| 5,160,689 | A | * | 11/1992 | Kamen | A45D 40/16 249/115 |
| 7,128,567 | B2 | * | 10/2006 | Avalle | A45D 40/16 425/440 |
| 2002/0086079 | A1 | * | 7/2002 | Kuo | A45D 40/16 425/405.1 |
| 2002/0086081 | A1 | * | 7/2002 | Kuo | A45D 40/16 425/440 |
| 2004/0219248 | A1 | * | 11/2004 | Avalle | A45D 40/16 425/269 |
| 2007/0023964 | A1 | * | 2/2007 | Gilg | A45D 40/16 264/313 |
| 2007/0295887 | A1 | * | 12/2007 | Kuo | A45D 40/16 249/137 |
| 2011/0286808 | A1 | * | 11/2011 | Castro | B65G 51/06 406/184 |

FOREIGN PATENT DOCUMENTS

FR    2 729 278 A1    7/1996
WO    WO 02/066331 A2    8/2002

* cited by examiner

METHOD FOR ATTACHING LIPSTICK TO A LIPSTICK DISPENSER, AND CORRESPONDING MACHINE

CROSS-REFERENCE TO RELATED APPLICATIONS

This application is a 35 USC 371 U.S. national stage filing of International Patent Application No, PCT/FR2012/051400 filed on Jun. 20, 2012, and claims priority under the Paris Convention to French Patent Application No, FR 11 55510 filed on Jun. 22, 2011.

FIELD OF THE DISCLOSURE

The invention concerns the field of methods and machines for attaching a stick of lipstick to a lipstick dispenser.

BACKGROUND OF THE DISCLOSURE

A stick of lipstick conventionally consists of a paste of cosmetic product which the user can apply by pressing it against her lips. The end of the stick which is placed against the lips is generally contoured for lips. The opposite end of the stick is often nested inside a receptacle of the dispenser. The receptacle is sometimes called a "cup," the stick of lipstick is called a "bullet," and the process of attaching the bullet inside the cup is called "nesting" the bullet.

In the case of a stick of lipstick made of soft paste, nesting it inside the cup requires exerting pressure on the end intended for the user's lips. The nesting force exerted can deform this end, which is undesirable.

In the case of a stick of lipstick made of hard paste, the position of the stick of lipstick relative to the dispenser may vary after insertion, which is undesirable.

Patent DE 900 544 therefore describes injecting a stream of compressed air in order to propel the stick to its nested position.

SUMMARY OF THE DISCLOSURE

The aim of the invention is to overcome at least one of the above disadvantages.

A first aspect of the invention concerns a method for attaching a stick of lipstick to a dispenser, the stick comprising a distal end intended for the lips, the dispenser comprising a receptacle having an insertion opening adapted to fit with a proximal end of the stick. The method comprises:

a moving step in which the insertion opening and the proximal end of the stick are brought adjacent to one another so that the insertion opening is substantially blocked, and a nesting step in which the stick is nested in the receptacle due to negative pressure created within the receptacle by a vacuum pump.

Because of the negative pressure, the force that must be exerted on the lip-application end of the stick can be reduced or even eliminated. Instead of being pushed, the stick of lipstick is partially or completely drawn in via the negative pressure created in the receptacle. Retention of the stick in the receptacle is established by the adapted insertion opening. It is thus possible to assemble sticks of lipsticks of softer paste than are usable with traditional attachment methods, or to assemble sticks of lipsticks having more fragile contoured ends, or to obtain better positional regularity for sticks of lipsticks of harder paste.

Advantageously, the receptacle comprises a bottom which the bullet is brought against by the exerted suction.

Advantageously, the method comprises a molding step in which the stick of lipstick is molded, the nesting step being preceded by a step of unmolding an area at the proximal end of the stick.

Advantageously, the stick is supplied within a shell having a deformable wall (the shell for example being part of a stick mold), and simultaneously with establishing a negative pressure inside the receptacle, negative pressure is created by a vacuum pump on the shell in order to release the stick from it.

Advantageously, a receptacle is used which has an internal area communicating with the outside via the insertion opening and via a port, an annular wall of the receptacle extending between the insertion opening and the port. The method comprises:

a step of confining an area outside the receptacle which includes the port, wherein a chamber is connected in a substantially fluid-tight manner to the annular wall, the insertion opening remaining outside the chamber, and a step of creating a negative pressure inside the chamber so that this negative pressure is propagated into the internal area via the port.

Advantageously, the annular wall has the same inside profile, adapted to fit to the stick, as the insertion opening, so that the stick is kept aligned with the axis of insertion.

In one variant, the nesting step includes a step of adjusting the position of the stick of lipstick within the receptacle of the dispenser by creating, within the receptacle, positive pressure or negative pressure relative to the atmospheric pressure.

Another aspect of the invention relates to a method for assembling a lipstick dispenser, comprising a step of preassembling the receptacle with an actuation mechanism of the dispenser, one of the above methods for attaching the stick of lipstick, and subsequent to the attachment of the stick of lipstick, a step of assembling the actuation mechanism with a decorative shell.

Advantageously, the decorative shell can be assembled away from the stick of lipstick attachment machine. This reduces the risk that the decorative shell will be scratched.

In yet another aspect, the invention concerns a machine for attaching stick of lipstick to a dispenser, the stick comprising a distal end intended for the lips, the dispenser comprising a receptacle having an insertion opening adapted to fit with a proximal end of the stick. The machine comprises:

a moving mechanism for bringing the insertion opening and the proximal end of the stick adjacent to one another so that the insertion opening is substantially blocked, and a device for creating negative pressure inside the receptacle so that the stick is nested inside the receptacle.

Advantageously, the device for creating a negative pressure in the receptacle comprises a chamber connected to a vacuum pump and a device for establishing a substantially fluid-tight connection of the chamber to the dispenser receptacle.

In a variant concerning the assembly of dispensers comprising an actuation mechanism, the chamber is able to receive at least part of the actuation mechanism.

In a variant concerning the assembly of dispensers comprising an actuation mechanism equipped with a body within which the receptacle slides axially between a retracted position and a protruding position, said body being adapted to fit with the receptacle in the protruding position; said machine comprising a device for establishing a substantially fluid-tight connection of the chamber to the body. Thus the substantially fluid-tight connection between the receptacle and the chamber involves the body of the actuation mechanism fitting with the receptacle and includes the substantially fluid-tight connection of the chamber to the body of the mechanism.

Advantageously, the machine comprises a stick of lipstick molding station having a removable spacer intended for molding the proximal end of the stick and a controllable arm for extracting the removable spacer.

Advantageously, the molding station comprises a wall of deformable material delimiting a mold cavity, an outside cavity surrounding the deformable wall, and a means for creating a vacuum in the outside cavity.

BRIEF DESCRIPTION OF DRAWINGS

The invention will be better understood by referring to the following detailed description of a few embodiments provided as non-limiting examples and illustrated by the accompanying drawings in which.

DETAILED DESCRIPTION OF THE DISCLOSURE

Figure 1:
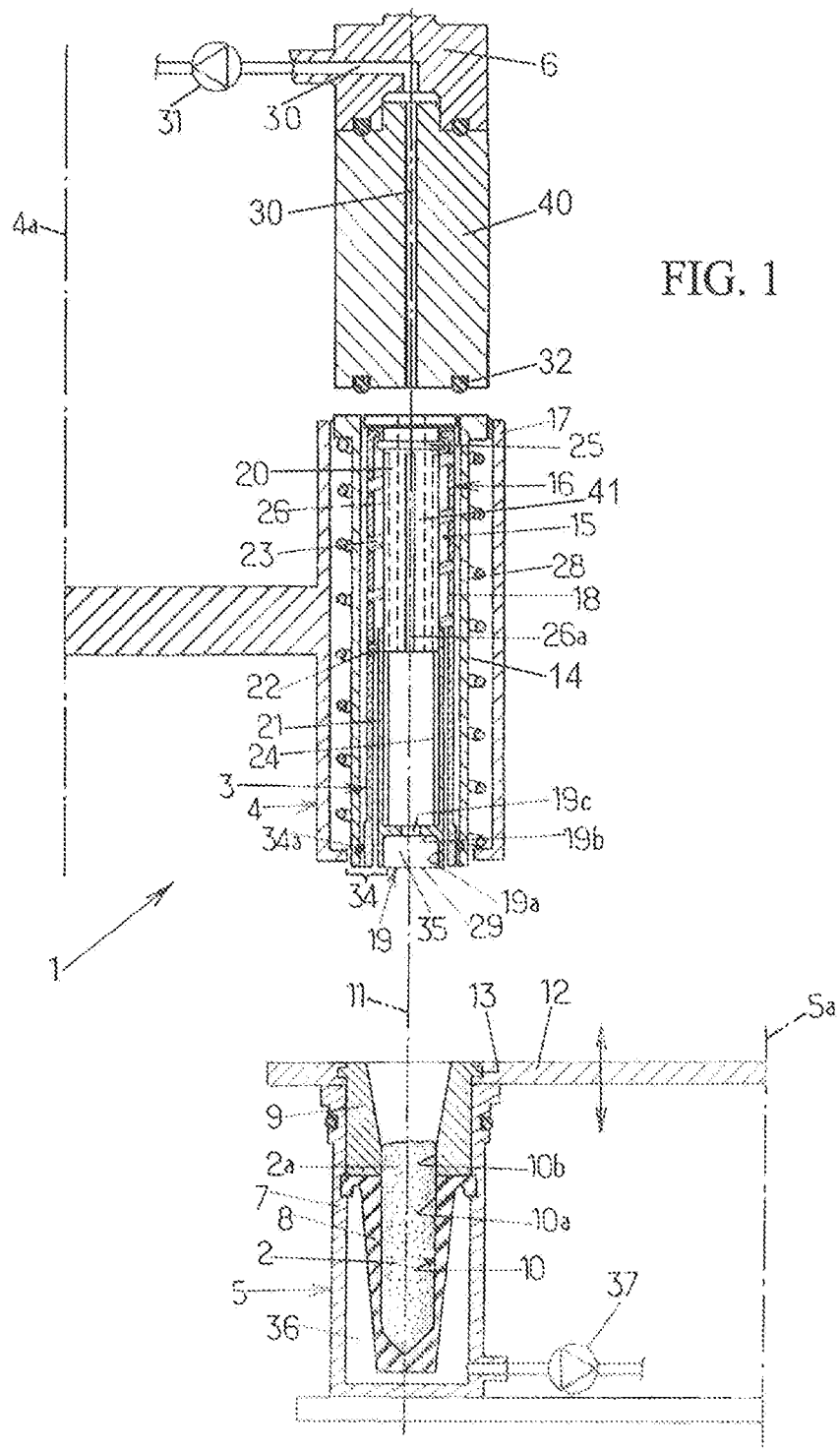
FIG. 1 is a longitudinal cross-section of a machine for attaching stick of lipstick to a dispenser, illustrated in its initial position after the stick has been molded.

As illustrated in FIG. 1, the machine 1 for attaching a stick of lipstick 2 to a dispenser 3 includes an upper station 4 which holds the dispenser 3 and a molding station 5 where the stick of lipstick 2 is molded, as well as an actuator of which only the head 6 is represented.

The molding station 5 comprises a frame 7 which houses a shell having a wall 8 of deformable material such as an elastomer, particularly silicone.

A mold spacer 9 is also housed in the frame 7, above the deformable wall 8. The spacer 9 and the deformable wall 8 together form a mold cavity 10 into which a cosmetic product that will constitute the stick of lipstick 2 is poured. The cosmetic product fills the entire internal hollow 10a of the deformable wall 8 as well as filling several millimeters of a hole 10b through the spacer 9.

Advantageously, the machine 1 can comprise a plurality of upper stations 4 mounted on a machine rotating about an axis 4a and a plurality of molding stations 5 mounted on a machine rotating about an axis 5a parallel to and at a distance from axis 4a. It is thus possible to introduce the dispenser 3 into an upper station 4 before said station is aligned along axis 11 with one of the molding stations 5.

An extraction arm 12 is able to move axially to extract the spacer 9 from the frame 7 and thus disengage the upper end 2a of the stick of lipstick 2.

Figure 2:
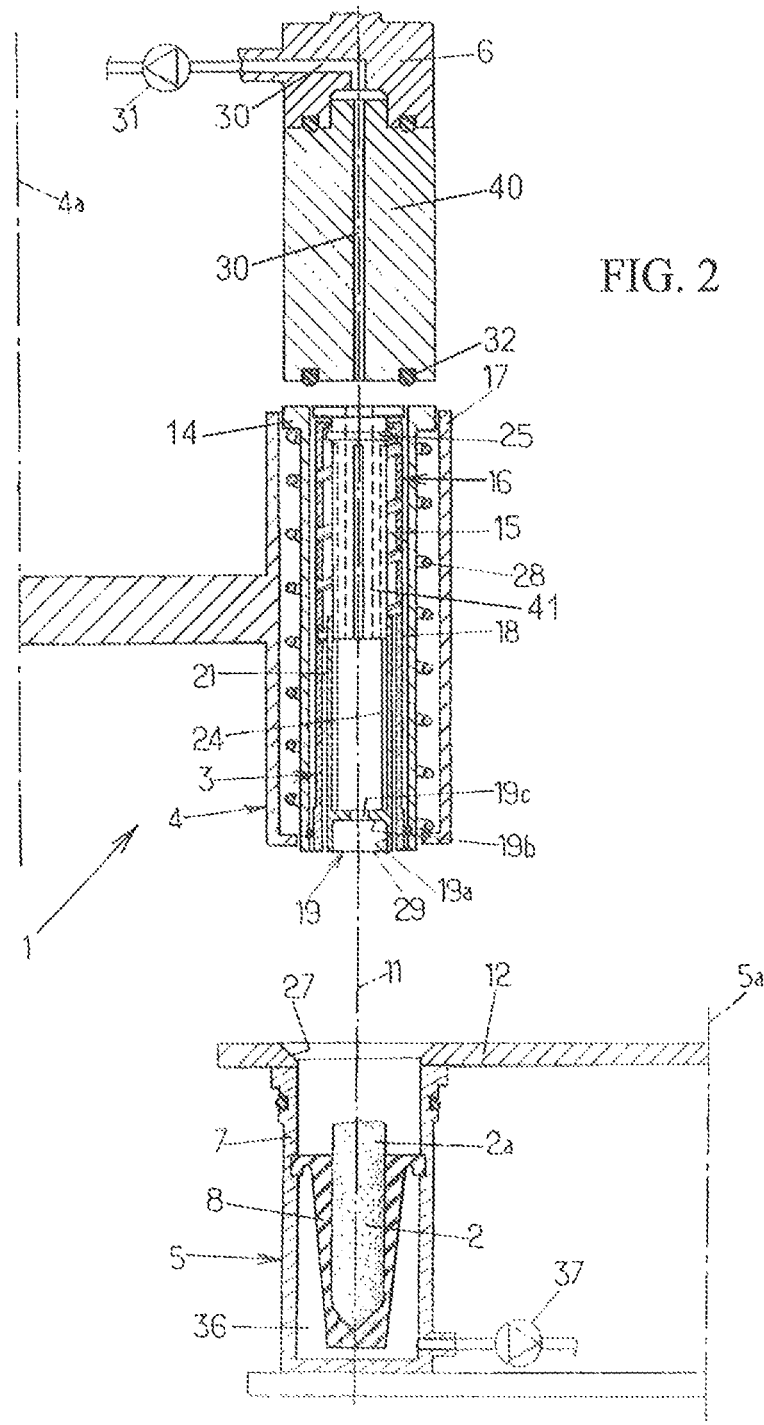
FIG. 2 is a longitudinal cross-section of the machine in FIG. 1 after the molding spacer has been disengaged from the end of the stick.

As illustrated in FIGS. 1 and 2, the extraction arm 12 can be a disk pivoting about axis 5a and able to move axially to raise the spacer 9 by its collar 13. The extraction arm 12 can be pivoted enough to allow a port 27 of the disk to provide free access to the upper end 2a of the stick of lipstick 2.

The molding station 5 also comprises an outside cavity 36, extending outside the shell having a deformable wall 8, and connected to a vacuum pump 37.

The upper station 4 will now be described. It is equipped with a retaining head 14 sliding axially within a holder 17 due to the action of the actuator head 6 and a return spring 28. The retaining head 14 has a housing which holds an actuation mechanism 16 of the dispenser 3. The actuator head 6 may be equipped with a spacer 40 which allows the upper station 4 to adjust to different heights of the actuation mechanism 16.

The actuation mechanism 16 comprises a body 18 of the dispenser, a receptacle 19, and a drive hub 20. The receptacle 19 comprises an annular wall 19a and a bottom 19b in which a port 19c is arranged. The receptacle 19 also comprises a rear apron 21 having a radially external spur 22 sliding in a helical groove 23 of the body 18 of the dispenser. The helical groove 23 may be a through groove which traverses the wall of the body 18 or may be a blind groove. The rear apron 21 also comprises ribs 24 extending longitudinally along the rear apron 21 and projecting radially inwards, towards the inside of the rear apron 21. The drive hub 20 has a circular rear groove 25 cooperating with the body 18 of the dispenser so as to be rotatably movable and translationally fixed relative to the body 18 of the dispenser. The drive hub 20 also comprises longitudinal grooves 26 adapted to fit with the longitudinal ribs 24 of the rear apron 21. Thus, when the drive hub 20 rotates, the receptacle 19 moves in a spiral along the helical groove 23. This allows the annular wall 19a and the bottom 19b to change from the "protruding" position illustrated in the figures to a "retracted" position.

Figure 3:
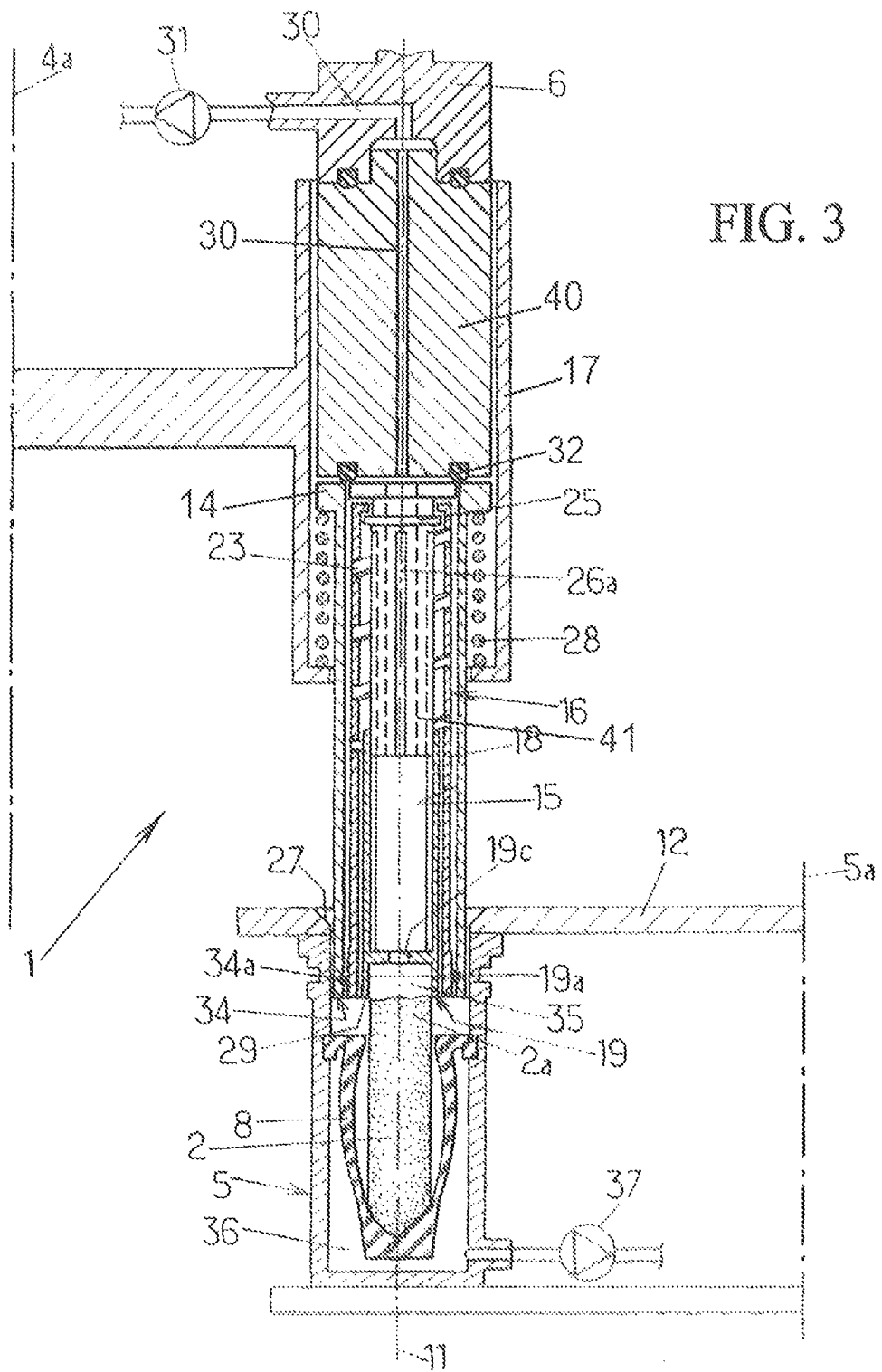
FIG. 3 is a longitudinal cross-section of the machine in FIG. 1, illustrating the transfer of the stick of lipstick from the molding station to the dispenser.

As illustrated in FIG. 3, the upper station 4 and the molding station 5 together form a mechanism (4-5) for moving the insertion opening (29) and the proximal end (2a) of the stick (2) adjacent to one another so that the insertion opening (29) is substantially blocked. In effect, the actuator head 6 and the adjusting spacer 40 descend, press against the top of the retaining head 14, and drive it downwards while compressing the return spring 28.

The actuator head 6 and the adjusting spacer 40 comprise a channel 30 connected to a vacuum pump 31, and a toroidal gasket 32 surrounds the channel 30.

In a variant, the gasket 32 can establish a fluid-tight seal between the adjusting spacer 40 and the retaining head 14. The retaining head 14, closed off by the spacer 40, then forms a chamber 15 containing the major portion of the mechanism 16 and in particular the major portion of the receptacle 19.

The retaining head 14 comprises a device 34 for establishing a substantially fluid-tight connection of the chamber 15 to the receptacle 19. The connecting device 34 comprises a toroidal seal 34a extending between the retaining head 14 and the body 18 of the dispenser as well as fitting between the annular wall 19a of the receptacle 19 and the body 18 of the dispenser 3. Thus, a negative pressure created by the vacuum pump 31 is propagated to the chamber 15 via the channel 30. The negative pressure in the chamber 15 is propagated in turn through the helical grooves 23 and a groove 26a in the drive hub 20 to the port 19c.

In another variant, the mechanism 16 is like a fluid-tight tube with a central port 41. The gasket 32 can then press against the top of the actuation mechanism 16. In this case, the chamber 15 accepting the major portion of the receptacle 19 consists of the fluid-tight body 18. Similarly to the above variant, the negative pressure of the channel 30 is propagated through the central port 41 of the actuation mechanism 16 to the port 19c.

In any of these variants, the annular wall 19a of the receptacle 19 has a circular free end defining an opening 29 in the receptacle 19 which is intended for the insertion of the stick 2 into the receptacle 19. The actuator head 6, the retaining head 14, and the actuation mechanism 16 with its receptacle 19 in the "protruding" position, descend until the opening 29 is adjacent to the upper end 2a of the stick of lipstick 2. This position corresponds to the position for transferring the stick 2 from the molding station 5 to the receptacle 19.

When the retaining head 14 is in the transfer position, the upper end 2a of the stick of lipstick 2 isolates from the outside an area 35 inside the receptacle 19 which communicates with the vacuum pump 31 via the port 19c.

The vacuum pump 37 of the molding station 5 creates a negative pressure in the external cavity 36. The deformable wall 8 of the shell detaches from the stick of lipstick 2 and releases the stick 2. Thus the negative pressure created within the area 35 inside the receptacle 19 draws the stick of lipstick 2 in. The stick of lipstick can be suctioned in until it rests against the bottom 19b of the receptacle 19.

The negative pressures created in the receptacle 19 and in the external cavity 36 may be established one before the other, and in any order, but they have at least one period where, simultaneously, the negative pressure in the receptacle 19 is exerting suction on the stick 2 and the negative pressure in the external cavity 36 releases the stick 2, thus allowing the transfer from the station 5 to the dispenser 3.

Figure 4:
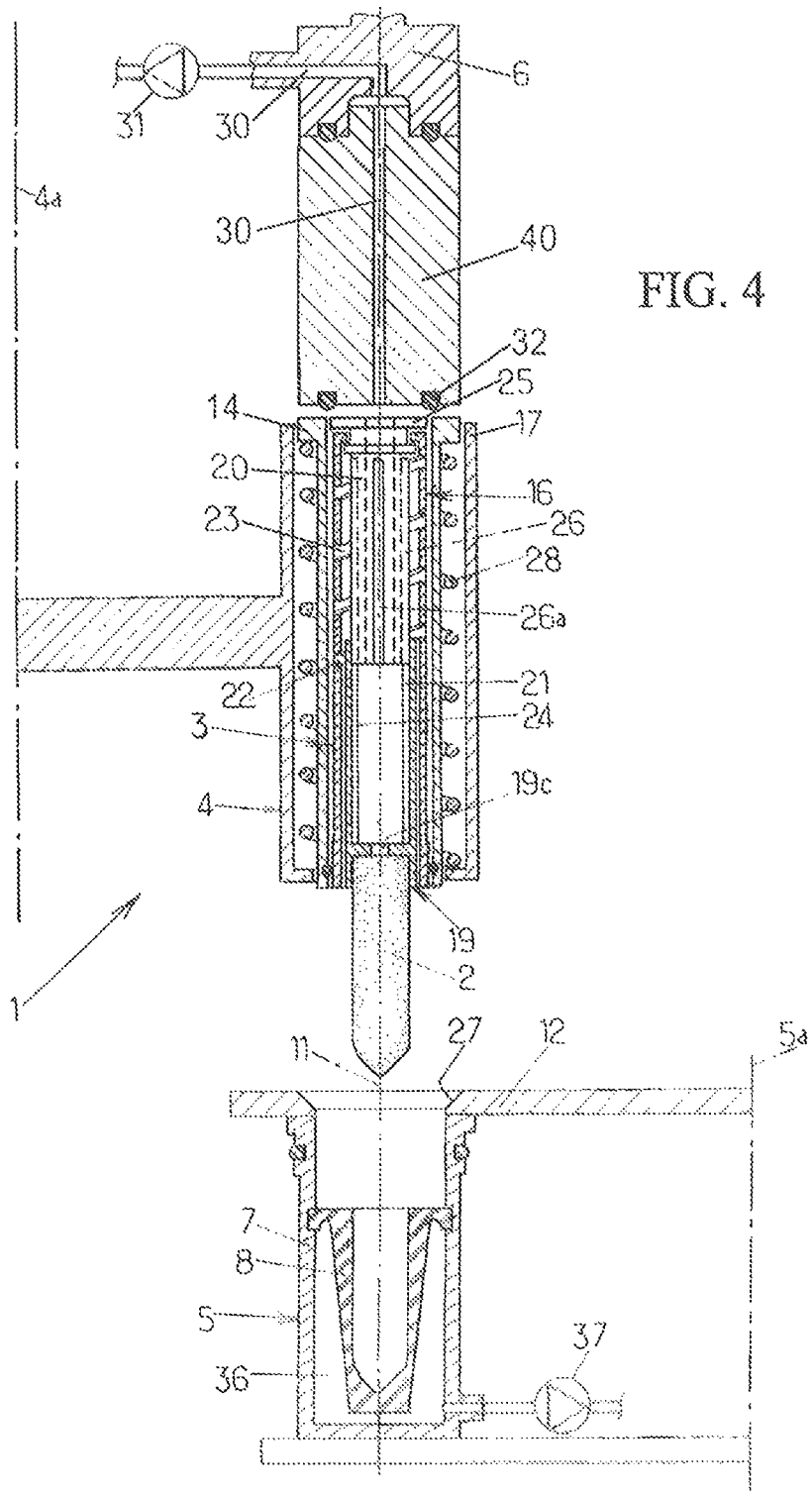
FIG. 4 is a longitudinal cross-section of the machine in FIG. 1, at the end of its cycle.

As illustrated in FIG. 4, the retaining head 14 rises to a position where the dispenser 3 to which the stick of lipstick 2 has been attached can be removed from the upper station 4.

It is understood that the invention can be implemented with any type of station 5 which is able to retain the stick of lipstick 2, disengage the end 2a of the stick, and release the stick of lipstick 2 when the insertion opening 29 of the receptacle 19 is substantially blocked by the end 2a.

Advantageously, a decorative shell (not illustrated) can be assembled to the actuation mechanism 16 by hooking it onto the drive hub 20. This last step in the method for assembling the lipstick dispenser can be performed away from the stick of lipstick attachment machine 1 described above. This prevents scratches and allows on-demand inventory management.

The method of the stick of lipstick attachment machine 1 is particularly advantageous for stick of lipstick 2 consisting of a soft cosmetic paste. It can also be used with cosmetic pastes of the usual hardness but having a particularly fragile contour where it touches the lips.

In one variant of the attachment method, the retaining head 14 can descend until the opening 29 of the receptacle 19 is level with the silicone wall 8 or until the end 2a of the stick of lipstick 2 reaches the bottom 19b of the receptacle 19. It is possible to only activate the vacuum pump 31 when conventional nesting would deform the stick of lipstick 2, in particular the contour of the end which is applied to the lips.

In another variant, the machine 1 can be used to adjust the position of the stick of lipstick in the receptacle 19 of the dispenser by creating in the receptacle 19 a positive pressure or a negative pressure relative to the atmospheric pressure. In this variant, the channel 30 or the chamber 15 can also be connected to a compressed air generator (not represented) via a controllable three-way valve.

The machine 1 can be used with any actuation mechanism having a port 19c opening into the area 35 inside the receptacle and not blocked off when the introduction of the stick 2 begins.

The bullet attachment and molding machine can comprise a single upper station 4 and/or a single molding station.

In one variant, the vacuum pump 31 can be connected directly to the chamber 15.

The invention claimed is:

1. Method for attaching a stick of lipstick to a dispenser, the stick comprising a distal end intended for the lips, the dispenser comprising a receptacle having an insertion opening adapted to fit with a proximal end of the stick, said method comprising:
    a moving step in which the insertion opening and the proximal end of the stick are brought adjacent to one another so that the insertion opening is substantially blocked, and;
    a nesting step in which the stick is nested in the receptacle due to negative pressure created within the receptacle by a vacuum pump;
    wherein the receptacle has an internal area communicating with the outside via the insertion opening and via a port, an annular wall of the receptacle extending between the insertion opening and the port, said method comprising:
        a step of confining an area outside the receptacle which includes the port, wherein a chamber is connected in a substantially fluid-tight manner to the annular wall, the insertion opening remaining outside the chamber, and
        a step of creating a negative pressure inside the chamber so that this negative pressure is propagated into the internal area via the port.

2. Method according to claim 1, comprising a molding step in which the stick of lipstick is molded, the nesting step being preceded by a step of unmolding an area at the proximal end of the stick.

3. Method according to claim 1, wherein the stick is supplied within a deformable wall, and wherein, simultaneously with establishing a negative pressure inside the receptacle, the stick is released from the deformable wall by means of another vacuum pump.

4. Method according to claim 1, wherein the nesting step includes a step of adjusting the position of the stick of lipstick within the receptacle of the dispenser by creating, within the receptacle, positive pressure or negative pressure relative to the atmospheric pressure.

5. Method for assembling a lipstick dispenser, comprising a step of preassembling a receptacle with an actuation mechanism of the dispenser, a step of attaching a stick of lipstick according to claim 1, and after the attachment of the stick of lipstick, a step of assembling the actuation mechanism with a decorative shell.

6. Machine for attaching a stick of lipstick to a dispenser, the stick comprising a distal end intended for the lips, the dispenser comprising a receptacle having an insertion opening adapted to fit with a proximal end of the stick, said machine comprising:
    a moving mechanism for bringing the insertion opening and the proximal end of the stick adjacent to one another so that the insertion opening is substantially blocked, and;
    a device for creating negative pressure inside the receptacle so that the stick is nested inside the receptacle, said device comprising a vacuum pump;
    wherein the receptacle has an internal area communicating with the outside via the insertion opening and via a port, an annular wall of the receptacle extending between the insertion opening and the port, said machine configured to:
        confine an area outside the receptacle which includes the port, wherein a chamber is connected in a substantially fluid-tight manner to the annular wall, the insertion opening remaining outside the chamber, and
        create a negative pressure inside the chamber so that this negative pressure is propagated into the internal area via the port.

7. Machine according to claim 6, wherein the device for creating a negative pressure in the receptacle comprises a chamber connected to the vacuum pump and a device for establishing a substantially fluid-tight connection of the chamber to the receptacle of the dispenser.

8. Machine according to claim 7, comprising an actuation mechanism, wherein the chamber is able to receive at least part of the actuation mechanism.

9. Machine according to claim 7, intended for assembling the dispenser comprising an actuation mechanism equipped with a body within which the receptacle slides axially between a retracted position and a protruding position, said body being adapted to fit with the receptacle in the protruding position; said machine comprising a device for establishing a substantially fluid-tight connection of the chamber to the body.

10. Machine according to claim 6, comprising a stick of lipstick molding station having a removable spacer intended for molding the proximal end of the stick and a controllable arm for extracting the removable spacer.

11. Machine according to claim 10, wherein the molding station comprises a wall of deformable material delimiting a mold cavity, an outside cavity surrounding the deformable wall, and a means for creating a vacuum in the outside cavity.

* * * * *